United States Patent [19]

Cavallino et al.

[11] 4,269,029

[45] May 26, 1981

[54] INTERNAL COMBUSTION ENGINE WITH EXHAUST EMISSION CONTROL SYSTEM

[75] Inventors: Francesco Cavallino, Pinerolo; Pasquale Martinez, Turin; Michele Allione, Turin; Roberto Schiavuzzi, Turin, all of Italy

[73] Assignee: Fiat Auto S.p.A., Turin, Italy

[21] Appl. No.: 13,994

[22] Filed: Feb. 22, 1979

[30] Foreign Application Priority Data

Mar. 23, 1978 [IT] Italy ............................ 67636 A/78

[51] Int. Cl.³ .................. F02M 23/10; F01N 3/10
[52] U.S. Cl. ............................... 60/293; 123/587; 123/588
[58] Field of Search ............... 60/278, 293; 261/34 B, 261/69 R; 123/119 A, 119 D, 97 B, 124 R, 124 A, 124 B

[56] References Cited

U.S. PATENT DOCUMENTS

| | | | |
|---|---|---|---|
| 3,706,444 | 12/1972 | Masaki | 123/97 B |
| 3,977,380 | 8/1976 | Atsumi | 123/124 B |
| 3,992,878 | 11/1976 | Moorman | 60/290 |
| 4,105,719 | 8/1978 | Saito | 261/34 B |
| 4,162,613 | 7/1979 | Tamura | 60/278 |
| 4,170,112 | 10/1979 | Bessho | 60/278 |

Primary Examiner—Michael Koczo, Jr.
Attorney, Agent, or Firm—Sughrue, Rothwell, Mion, Zinn and Macpeak

[57] ABSTRACT

A four cylinder spark ignition internal combustion engine has an exhaust emission control system including means for admitting fresh air into the exhaust system in order to promote a further combustion of partly burnt components in the gases coming from the combustion chambers, this means include a "reed" valve connected to the exhaust ports leading from the first and fourth cylinders (numbering from one end of the engine) through internal passages within the cylinder head; the system also comprises an exhaust gas recirculating system comprising a pneumatic valve which opens, when the conditions are appropriate, to draw off a proportion of the exhaust gases from the exhaust side of the engine and admit them to the induction side of the engine taking exhaust gases from branches of the exhaust manifold carrying exhaust gases from the second and third cylinders; in addition there is a system for admitting supplementary air to the induction manifold downstream of the carburettor during engine overrun conditions except when the engine is cold, and the carburettor is provided with supplementary pumps and valves which only function when the engine is cold, being inhibited as the engine approaches its normal working temperature.

2 Claims, 1 Drawing Figure

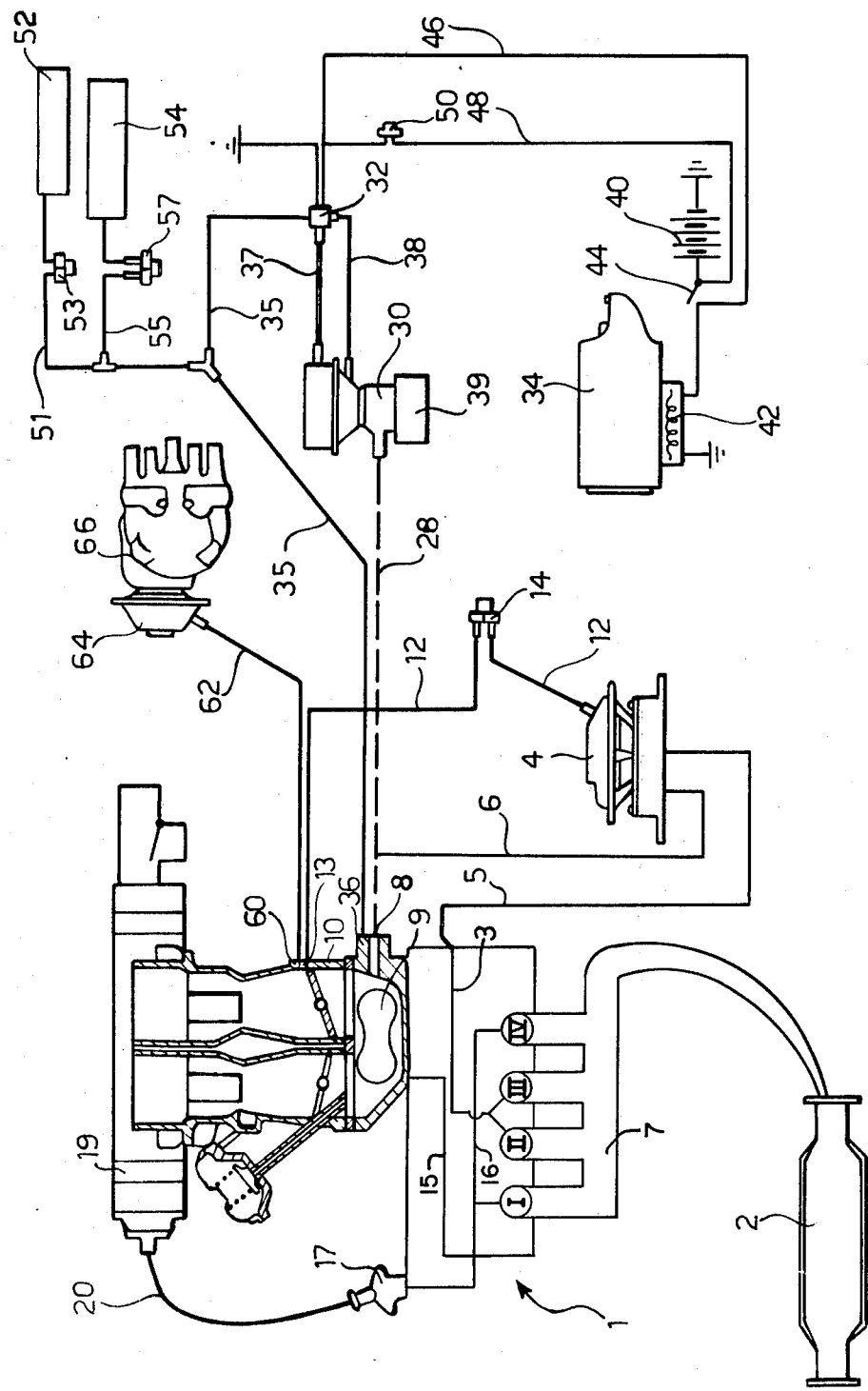

INTERNAL COMBUSTION ENGINE WITH EXHAUST EMISSION CONTROL SYSTEM

BACKGROUND OF THE INVENTION

The present invention relates to a spark ignition internal combustion engine for automobiles, having a system for controlling the emission of noxious gases from the exhaust comprising the combination of a plurality of devices including an after burner for the exhaust gases, the function of which is to reduce the amount of carbon monoxide and unburnt hydrocarbons in the exhaust gases, means for improving the carburation when the engine is cold (this means also functioning to improve the fuel consumption when the engine is hot), means for recycling at least part of the exhaust gases to the induction side of the engine, and means for reducing the emission of pollutants during deceleration of the engine.

In an attempt to reduce atmospheric pollution many countries now have laws which require internal combustion engines to be fitted with various devices for the purpose of reducing, as far as possible, the emission of pollutants, and for improving the fuel consumption. In order to comply with these laws many automobile manufacturers fit their vehicles with after burner means for effecting further combustion of the exhaust gases by admitting into the exhaust system further combustion air so that the combustion of carbon monoxide and hydrocarbons is as complete as possible. Further measures include the addition into the fresh fuel/air mixture which is about to be burnt a small part of the hot exhaust gases, which thus reduces the formation of oxides of nitrogen, and the introduction of supplementary air into the induction manifold during deceleration of the engine whereby to reduce the fuel content in the fuel/air mixture thereby reducing the emission of unburnt hydrocarbons which are an important part of the pollutants in the exhaust gases emitted in these conditions.

However, in certain transitional operating conditions of an internal combustion engine some of the above mentioned measures can cause engine operating difficulties, particularly during starting of the engine, and in running conditions when the engine is cold.

OBJECTS OF THE INVENTION

A primary object of the present invention is a system for reducing as much as possible the emission of noxious gases from an internal combustion engine.

Another object of the invention is a system for reducing the emission of noxious gases from an internal combustion engine which, while achieving the above stated object, also encourages good behaviour of the engine during all operating conditions.

SUMMARY OF THE INVENTION

The above stated objects are achieved, according to the present invention by a spark ignition internal combustion engine having an air filter, first, second, third and fourth cylinders, an exhaust manifold first, second, third and fourth exhaust ports leading from said first, second, third and fourth cylinders respectively to said exhaust manifold, and an exhaust emission control system including means for admitting air into the engine exhaust system, said means being constituted by; automatic "reed" valve means, air conduit means interconnecting said air filter of said engine and said automatic "reed" valve means, means carrying said automatic "reed" valve means on the cylinder head of said engine, and means defining internal passageways in said cylinder head, said internal passageways communicating at one end with said automatic "reed" valve means and at the other end with said first and fourth exhaust ports leading from said first and fourth cylinders of said engine.

Other features and advantages of the invention will become apparent from reading the following description, in which reference is made to the single FIGURE of the accompanying drawing, provided purely by way of non-restrictive example.

BRIEF DESCRIPTION OF THE DRAWING

The single FIGURE of the accompanying drawing is a schematic diagram illustrating the novel exhaust emission control system of the present invention adapted for use with a four cylinder internal combustion engine of a type suitable for an automobile, which engine is also shown, in very diagrammatic form, in the drawing.

DESCRIPTION OF THE PREFERRED EMBODIMENT

In the drawing there is shown, generally indicated with the reference numeral 1, a four cylinder internal combustion engine having an induction system including a double body carburettor 10 and an induction manifold 9, and an exhaust system which includes a catalytic silencer 2 of the oxidising and insulated type. The cylinders of the engine, which may be in any configuration, such as in-line or vee, are conventionally referred to by numbers from one to four. In an in-line automobile engine cylinder one is usually the one at the front and the cylinders are numbered consecutively to cylinder four at the rear, but for the purpose of this description any other suitable fixed numbering system may be employed. For example, in an in-line engine numbering may be commenced from the rear. The exhaust system of the engine 1 includes an exhaust manifold 7 having four branches, one connected to each of the four cylinders, and provided with an exhaust gas take-off point 3 on the branches carrying exhaust gases from cylinders two and three, from which exhaust gases are drawn for exhaust gas recycling by an exhaust gas recycling system which includes a valve 4 of known type, for example one which is sensitive not only to the variation of a control pressure at a control inlet thereof, but is also sensitive to back pressure at the inlet; such a valve is usually termed an E.G.R. (Exhaust Gas Regulation) valve. The EGR valve 4 has an inlet connected by a duct 5 to the gas take-off points 3 in the exhaust manifold 7, and an outlet connected by a duct 6 to an inlet 8 on the induction manifold 9 of the engine, located at a point downstream of the carburettor 10. The control inlet of the valve 4 receives a vacuum signal through a duct 12 which communicates, through a hole 13 in the body of the carburettor, with the interior of the induction duct at a point located upstream of the butterfly of the first body of the carburettor 10. As mentioned above, switching of the valve is dependent not only on the vacuum signal in the duct 12 but also on the value of the back pressure existing in the exhaust duct.

A normally closed temperature sensitive valve 14 of known type is located in series in the duct 12. This valve 14 is positioned so that it can sense the temperature of the coolant fluid of the engine 1 and acts to close off the pneumatic valve 4 from the signal vacuum to prevent the pneumatic valve 4 from passing exhaust gas to be recycled whilst the engine coolant is below a certain threshold temperature.

Within the cylinder head 15 of the engine, there are formed internal passages 16 opening out into the exhaust ports leading from cylinders one and four of the engine to the corresponding branches of the exhaust manifold. To the passages 16 is connected an automatic breather valve 17 of a type commonly referred to as a "reed" valve. The "reed" valve 17 operates to draw fresh air from an air filter 19 of the engine through a conduit 20 and to deliver it to the exhaust ports of cylinders one and four in order to promote further combustion of those gases which are exhausted from the combustion chambers of the engine before combustion thereof is complete, whereby to reduce the content of noxious pollutants in the exhaust gases.

To the inlet 8 on the induction manifold 9 (to which the outlet of the EGR valve 4 is connected) there is also connected, by means of a duct 28, a pneumatic valve 30 of known type, commonly termed a "gulp" valve, which forms part of an arrangement acting to admit a flow of supplementary air into the induction manifold of the engine during deceleration conditions. The "gulp" valve has a large diameter air inlet covered by an air filter 39, and an outlet connected by a duct 28 to the inlet opening 8 in the induction manifold 9. Communication between the inlet and outlet is controlled by a valve shutter (not shown) controlled by a diaphragm (also not shown) which separates the interior of the valve into an upper chamber and a lower chamber, both of which chambers have respective inlets thereto. As is known, when the pressure in the upper chamber is lower than that in the lower chamber the diaphragm moves upwardly carrying with it the valve shutter thereby closing communication between the inlet and the outlet of the valve. Correspondingly, when the pressure in the lower chamber is lower than that in the upper chamber, the diaphragm moves downwardly to open the valve.

The arrangement for admitting supplementary air to the induction manifold also includes means for preventing this flow of supplementary air during starting conditions and when the engine is cold in order to avoid various problems which would otherwise arise during these conditions. The arrangement includes a three way, two position solenoid valve 32 the excitation winding of which is connected to the starter motor 34 of the engine. The solenoid valve 32 has three ports one of which is connected by means of a duct 35 to a hole 36 in the induction duct whereby to communicate with the interior thereof at a point downstream from the butterfly valve of the carburettor 10; the second port of the solenoid valve 32 is connected by a duct 37 to the upper chamber of the "gulp" valve 30 and the third port of the solenoid valve 32 is connected to the lower chamber of the "gulp" valve by means of a duct 38. The arrangement operates as follows:

The "gulp" valve 30 is closed when its diaphragm is drawn upwards by a vacuum in the upper chamber of the valve and is open when its diaphragm is drawn downwardly by a vacuum in the lower chamber. Resilient or other biasing means urges the diaphragm upwardly to the closed position of the valve so that a vacuum in the lower chamber must exceed a certain threshold value before the valve is opened. The magnitude of this threshold can be selected by suitable selection of the diaphragm biasing. When the winding of the solenoid valve 32 is not excited the duct 35 is put into communication by solenoid valve 32 with the duct 38 and therefore with the lower chamber of the "gulp" valve 30. Thus when the vacuum in the induction manifold, and therefore in the duct 35 is sufficiently high, as occurs in the case of deceleration of the engine, the diaphragm of the "gulp" valve 30 is drawn downwardly whereby to open this valve, allowing a flow of supplementary air to pass into the induction manifold, this air being filtered in the air filter 39. This admission of supplementary air to the induction manifold serves to weaken the fuel/air mixture before it enters the combustion chambers of the engine thereby reducing, to some extent, the peaks of emission from the exhaust system of unburnt hydrocarbons, which peaks occur during deceleration; the admission of supplementary air to the induction manifold also helps to prevent the occurrence of small explosions or popping due to backfiring in the exhaust system. The admission of supplementary air to the induction manifold would be dangerous, and possibly damaging to the engine, however, when the engine is running cold, that is during and immediately after starting, before it has warmed up to its normal operating temperature. The invention avoids this disadvantageous possibility in the following manner:

A battery 40 is connected to the winding of the starter motor 42 via a switch 44. The excitation winding of the solenoid valve 32 is connected to the winding of the starter motor 34 by an electrical conductor 46, and directly to the battery 40 by a conductor 48 in which is located a temperature sensitive switch 50 positioned at a point on the engine where it can sense the temperature of the engine coolant fluid. Temperature sensitive switch 50 is closed when the temperature of the engine coolant fluid is below a certain threshold value and opens when the temperature increases above this threshold.

Upon starting of the engine the solenoid valve 32 is excited via the conductor 46, whilst when starting is accomplished, with the switch 44 open, and with the motor cold, the solenoid valve 32 is excited via the conductor 48, and the temperature sensitive switch 50 which in these conditions is closed. When the solenoid valve is excited it puts the duct 35 into communication with the upper chamber of the "gulp" valve 30 instead of the lower chamber, so that the "gulp" valve 30 is now held firmly closed and no flow of air can pass through it to reach the induction manifold whatever the value of the depression existing therein. When the engine coolant warms up to a selected threshold value the temperature sensitive switch 50 responds to this by opening thereby interrupting the connection to the solenoid valve 32 so that this latter becomes de-energised and therefore puts the duct 35 into communication with the lower chamber of the "gulp" valve 30 so that when the vacuum in the manifold rises above a certain threshold, which it does upon deceleration, the valve 30 opens to admit supplementary air as described above. The carburettor 10 is fitted with an additional pneumatic valve 52 (shown diagramatically as a box separated from the carburettor in the drawing) which forms part of a system termed a "power valve", connected to the duct 35 by means of a duct 51. A normally closed temperature sensitive valve 53, sensitive to the temperature of the engine coolant fluid, is connected in series in the duct 51. The pneumatic valve in the induction manifold is below a predetermined threshold, and in these conditions it enriches the mixture. This enrichment of the mixture in low vacuum conditions only constitutes an improvement in engine operating conditions when the engine is cold, however, and would deleteriously affect the fuel consumption if it continued when the engine was hot. The temperature sensitive valve 53 in series in the duct 51 operates therefore to inhibit the operation of the pneumatic valve 52 by closing off its communication with the duct 35 when the temperature of the engine coolant rises above a predetermined threshold value, so that the pneumatic valve 52 is then no longer sensitive to the vacuum in the induction manifold, and thus does not deliver any supplementary fuel, whatever the vacuum in the manifold, once the engine has attained the threshold temperature.

As well as the pneumatic valve 52 of the "power valve" system the carburettor 10 also incorporates a pneumatic pump 54 (also shown separated from the carburettor in the drawing) which is a secondary compensation pump. This pump is also connected to the duct 35 by means of a duct 55 in which is located, in series, a temperature sensitive valve 57 which is open when the engine is cold and is sensitive to the temperature of the engine coolant. The pneumatic pump 54 works by delivering supplementary petrol when there is a strong variation of depression in the induction manifold, but only when the engine is cold, since when the engine is hot the temperature sensitive valve 57 closes and the pneumatic pump 54 remains inactive; this has the effect of reducing pollution by the engine when it is hot, whilst nevertheless ensuring that the engine operating conditions are optimum when the engine is cold.

Upstream of the butterfly of the carburettor 10 there is a hole 60 which is connected in a known way, by means of a duct 62, to the pneumatic advance and retard capsule which adjusts the ignition timing of the ignition distributor 66 in dependence on the vacuum in the induction system of the engine, which in turn is dependent on the combination of throttle opening and engine speed.

It will be appreciated that all the temperature sensitive valves which are shown in different locations around the system illustrated in the drawing would in a practical embodiment of the system be conveniently regrouped in a single centralised control unit where they can be in good thermal contact with the engine coolant fluid.

What is claimed is:

1. A spark ignition internal combustion engine having an air filter,
   first, second, third and fourth cylinders,
   an exhaust manifold
   first, second, third and fourth exhaust ports leading from said first, second, third and fourth cylinders respectively to said exhaust manifold, and
   an exhaust emission control system including means for admitting air into the engine exhaust system, said means being constituted by;
   automatic "reed" valve means,
   air conduit means interconnecting said air filter of said engine and said automatic "reed" valve means,
   means carrying said automatic "reed" valve means on the cylinder head of said engine, and
   means defining internal passageways in said cylinder head, said internal passageways communicating at one end with said automatic "reed" valve means and at the other end with said first and fourth exhaust ports leading from said first and fourth cylinders of said engine, said engine having an engine starter motor and further including means for the admission of supplementary air into the induction manifold, said means comprising:
   means defining a supplementary air inlet into said induction manifold of said engine,
   a pneumatic "gulp" valve having an air inlet, an air outlet and first and second control pressure inlets,
   means connecting said air outlet of said "gulp" valve to said supplementary air inlet into said induction manifold of the engine,
   a three port, two position pneumatic solenoid valve having an electrical winding,
   means connecting first and second ports of said three port solenoid valve to said first and second control pressure inlets of said pneumatic "gulp" valve,
   means defining a hole in said induction manifold,
   means connecting said hole in said induction manifold to the third of said three ports of said solenoid valve,
   means connecting said electrical winding of said solenoid valve to the winding of said engine starter motor,
   an electrical battery,
   temperature sensitive switch means mounted on the cylinder head of said engine and connected in series between said solenoid valve and said electrical battery, said temperature sensitive switch means being sensitive to the temperature of the engine coolant and closed when the engine coolant is below a predetermined threshold,
   electrical conductor means connected in parallel with said temperature sensitive switch means between said winding of said solenoid valve and said engine starter motor, and
   selectively operable switch means closable to connect said electrical conductor means and said engine starter motor to said battery whereby said solenoid valve is energized when said selectively operable switch means is closed to energize said starter motor and when said temperature sensitive switch means is closed.

2. The spark ignition internal combustion engine of claim 1, wherein said exhaust manifold has first, second, third and fourth branches respectively communicating with said first, second, third and fourth exhaust ports, and there is further provided an exhaust gas recirculating system including,
   a pneumatic recirculation valve for said exhaust gas, said pneumatic recirculation valve having an exhaust gas inlet, an exhaust gas outlet, and a control pressure inlet, and being sensitive both to the pressure at said control pressure inlet and the pressure at said exhaust gas inlet,
   respective exhaust gas take-off points on each of said second and third branches of said exhaust manifold,
   means connecting said exhaust gas inlet of said exhaust gas recirculating valve to said exhaust gas take-off points on said second and third branches of said exhaust manifold,
   means defining a hole in the induction duct of said engine upstream of the butterfly valve of said carburettor,
   control pressure conduit means connecting said control pressure inlet of said exhaust gas recirculating valve to the induction duct of said engine through said hole in said induction duct of said engine, and
   temperature sensitive valve means responsive to the temperature of the engine coolant, said temperature sensitive valve means being connected in series in said control pressure conduit means and operating to close communication between said control pressure inlet of said exhaust gas recirculating valve and said induction duct of said engine when the temperature of the engine coolant is below a predetermined threshold value.

* * * * *